L. PETERSON.
WILD OATS SEPARATOR AND GRAIN CLEANER AND GRADER.
APPLICATION FILED JUNE 28, 1915.
1,206,367.
Patented Nov. 28, 1916.
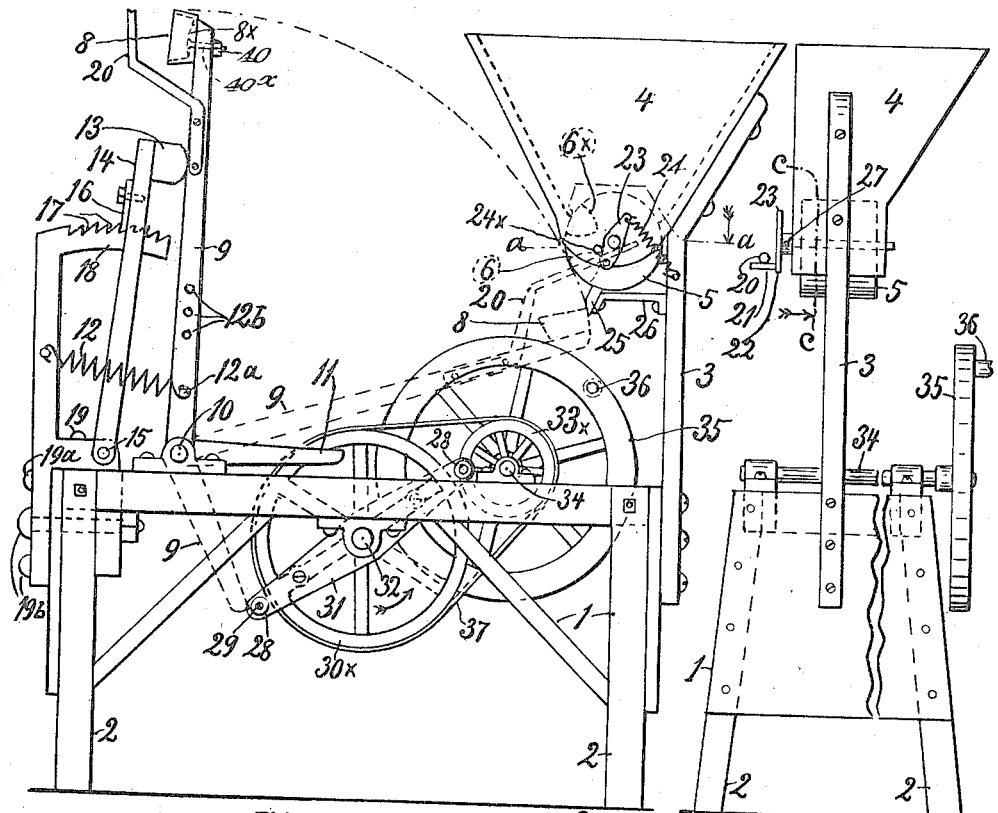
FIG. 1.
FIG. 3.
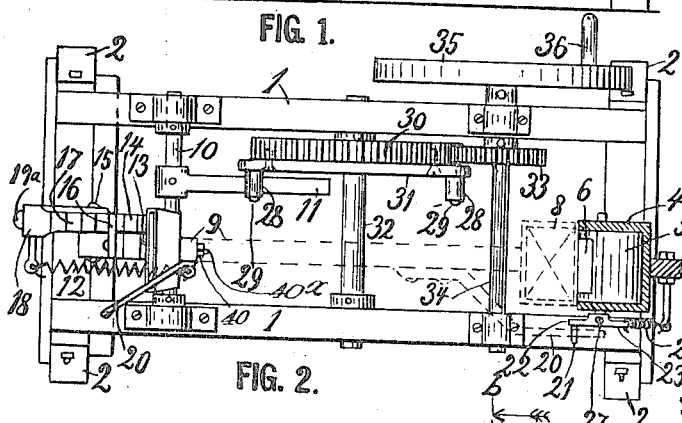
FIG. 2.
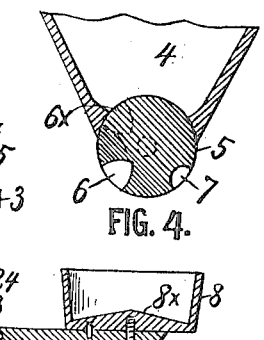
FIG. 4.
FIG. 6.
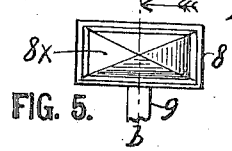
FIG. 5.
INVENTOR.
Lars Peterson.
BY his ATTORNEY:
A. M. Carlsen.

UNITED STATES PATENT OFFICE.

LARS PETERSON, OF COLMAN, SOUTH DAKOTA.

WILD-OATS SEPARATOR AND GRAIN CLEANER AND GRADER.

1,206,367.   Specification of Letters Patent.   Patented Nov. 28, 1916.

Application filed June 28, 1915. Serial No. 36,610.

*To all whom it may concern:*

Be it known that I, LARS PETERSON, a citizen of the United States, residing at Colman, in the county of Moody and State of South Dakota, have invented new and useful Wild-Oats Separators and Grain Cleaners and Graders, of which the following is a specification.

My invention relates to improvements in wild oats separators and grain cleaners, and the main object is to provide a cheap, simple and highly effective machine for separating wild oats from cultivated oats, wheat, rye and barley.

The machine is so constructed that it throws or casts the mixed grain and wild oats in predetermined quantities with equal force through the air in approximately horizontal direction, whereby the heavier grain is thrown farthest, the next lighter not so far and the wild oats and other light stuff being retarded by the air drop at a place still nearer to the point from which the casting takes place.

In the accompanying drawing,—Figure 1 is a side elevation of a machine embodying my invention. Fig. 2 is a top view of the machine shown in Fig. 1, with the hopper intersected on the line $a$—$a$ Fig. 1 and so modified that two gear wheels take the place of two pulleys and a belt in Fig. 1. Fig. 3 is an end elevation of the machine in Fig. 1 with many parts omitted and the frame reduced in width by breaking away a portion near the middle of it. Fig. 4 is a section on the line $c$—$c$ Fig. 3. Fig. 5 is a face view of the scoop by which the grain is cast. Fig. 6 is a section on the line $b$—$b$ Fig. 5.

Referring to the drawing by reference numerals, 1 designates the main frame of the machine. It is built strong, is of elongated form and supported by four legs 2, 2. At one end of the frame is fixed a post or standard 3 holding a hopper 4 designed as a magazine to hold the grain to be cleaned. In the bottom opening of the hopper is journaled a roller 5 having differently sized side pockets 6 and 7 which when the roller is oscillated will carry a small or a large quantity of grain from the hopper into a casting scoop 8. The latter is provided with a handle or arm 9 which is secured on a shaft 10 having a rocker arm 11.

The scoop arm 9 is normally held by a spring 12 against a cushion 13 fixed on a post 14; the latter is pivoted at 15 and carries a latch 16 adapted to engage either one of several notches 17 in a segmental bracket 18 secured at 19, 19$^a$ and 19$^b$ to the frame and to which the spring 12 may be attached.

Secured on the arm 9 is a finger 20, the function of which is to impart an oscillating, that is, partly rotating movement of the roller 5 by pressing downward upon a crank pin 21 of a crank 22, which is fixed at one end of the roller and provided with an arm 23 attached to a spring 24 by which the roller is rotated back to normal position with the crank stopping against a pin 24$^\times$ as soon as the finger 20 is raised by the arm 9 and spring 12.

In Fig. 1 25 is a guide or guard held by an arm 26 to prevent escape of grain between the roller and the scoop when the latter is in its lowered position for receiving the grain from the pocket 6, or if a smaller charge of grain is desired, the pocket 7 is moved into active position and the pocket 6 into idle position; this change is made by loosening the screw 27 in the crank, then turning the roller some and tightening the screw again.

The arm 11 is actuated by two antifriction rollers 28 on studs 29 carried by a gear wheel 30 (in Fig. 2) or by a special piece 31 secured to the wheel or it may be secured to the shaft 32 of said wheel, and the latter is rotated by a pinion 33 fixed on a shaft 34, which is turned by a combined fly-wheel and pulley 35 adapted to be rotated either by a belt (not shown) or a handle 36 if the machine is of the small size adapted to be operated by hand.

In Fig. 1 is shown how in small machines, or wherever so desired, a belt 37 and pulleys 30$^\times$ and 33$^\times$ may take the places of the gears 30 and 33 in Fig. 2.

In Figs. 5 and 6 is shown how the bottom 8$^\times$ of the scoop 8 is bulged upward in the middle and the sides of the scoop incline outward so as to facilitate the spreading effect of the grain produced by the bulged bottom. The scoop may be secured on the arm 9 by any suitable means, of which a screw 40 is shown in Fig. 6 and a bolt 40$^\times$ in Figs. 1 and 2.

In the operation of the machine the mixed grain and wild oats are placed in the hopper 4, the wheel 35 rotated at a speed which will cause the scoop to swing at intervals best suited for the cleaning of the grain, it being understood that if the scoop swings too fast the air space through which the grain passes during the cleaning process may become too much disturbed for giving the best effect; the speed of the scoop must be regulated to some extent by the length of the arm of the scoop and the weight of the grain operated on, and also the size of the charge cast by the scoop; an approximate speed may be about thirty strokes per minute. If a slower speed is desired without slowing the speed of the fly-wheel, then one of the studs 29 may be removed. As each roller 28 passes the arm 11 the spring 12 yields until the scoop is in the position shown in dotted line in Figs. 1 and 2, and as this causes the small arm or finger 20 to turn the roller 5, the pocket 6 will empty its contents into the scoop, and as the roller 28 has passed the arm 11 the spring 12 swings arm 9 against the cushion or block 13 and thereby sends the charge of grain in the scoop through the air in a horizontal or slightly upward direction, so that the wild oats drop near the machine and the cultivated oats, or it may be barley, rye or wheat, drop farther and farther away from the machine according to their gravity, thus grading the useful grain and separating the wild oats and other light stuff therefrom in a single operation. By changing the latch 16 into the different notches 17, the scoop will have its stroke varied and will also throw the grain in a more or less upward direction. And by moving the end of the spring 12 to one of several studs 12$^b$ higher up (see Fig 1) the tension of the spring will be increased.

In Fig. 4 is best shown how the pocket 6 is in the position 6$^x$ while being filled and in the full line position 6 while being emptied into the scoop.

I am aware that the method or art of separating heavy and light substances or grain from chaff by casting the same from a hand scoop is not broadly new; but I am not aware that it has ever been discovered heretofore that wild oats are sufficiently lighter than grain to be separated therefrom by casting; neither do I know that any machine has heretofore been invented for operating a casting scoop with even and regular speed and with equal charges in it, so as to obtain the best results from the method of casting grain to be cleaned, separated or graded. I therefore do not claim the method broadly; but

I claim:

1. A wild oats separator comprising a frame, a casting scoop having an arm pivoted in the frame, a spring acting on said arm to swing the scoop forward, an obstructing device for stopping the arm after it has attained a suitable speed for casting the grain from the scoop, a rotating wheel and operative connection between said wheel and the scoop arm to swing it against the resistance of the spring and then suddenly release it to let the spring throw it against the obstruction; a hopper adapted to hold a supply of uncleaned grain, a delivering device in the bottom of the hopper adapted to convey a charge of grain to the scoop, means whereby the delivering device is operated automatically when the scoop is swung into position to receive said charge, and means whereby the delivering device is automatically returned to the position in which it receives each charge of grain from the hopper.

2. In a machine of the kind described, the combination with a hopper, of a grain delivering device in the bottom thereof and constructed to deliver small or large charges of grain from the hopper, means for automatically operating said delivering device when the machine is in operation, a spring actuated casting scoop so actuated by the machine that it receives each separate charge delivered by said delivering device; and means for so adjusting the delivering device that it delivers only the same quantity in each charge until it is regulated to deliver a larger or smaller quantity in each charge.

In testimony whereof I affix my signature, in presence of two witnesses.

LARS PETERSON.

Copies of this patent may be obtained for five cents each, by addressing the "Commissioner of Patents, Washington, D. C."